(12) United States Patent
Xiong et al.

(10) Patent No.: US 10,637,309 B2
(45) Date of Patent: Apr. 28, 2020

(54) ROTOR LAMINATION AND MOTOR HAVING THE SAME

(71) Applicant: UBTECH Robotics Corp, Shenzhen (CN)

(72) Inventors: Youjun Xiong, Shenzhen (CN); Yan Zhou, Shenzhen (CN); Youpeng Li, Shenzhen (CN); Wenhua Fan, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 30 days.

(21) Appl. No.: 16/195,866

(22) Filed: Nov. 20, 2018

(65) Prior Publication Data

US 2019/0165622 A1    May 30, 2019

(30) Foreign Application Priority Data

Nov. 28, 2017  (CN) .......................... 2017 1 1213150

(51) Int. Cl.
| | |
|---|---|
| *H02K 5/24* | (2006.01) |
| *H02K 1/22* | (2006.01) |
| *H02K 11/22* | (2016.01) |
| *H02K 29/03* | (2006.01) |

(52) U.S. Cl.
CPC .......... *H02K 1/223* (2013.01); *H02K 11/022* (2013.01); *H02K 29/03* (2013.01); *H02K 2201/03* (2013.01); *H02K 2213/03* (2013.01)

(58) Field of Classification Search
CPC ........ H02K 29/03; H02K 5/24; H02K 11/022; H02K 2201/03; H02K 2213/03
USPC ............. 310/51, 216.093–216.094, 262–269
See application file for complete search history.

(56) References Cited

U.S. PATENT DOCUMENTS

| | | | | |
|---|---|---|---|---|
| 5,189,325 | A * | 2/1993 | Jarczynski | H02K 9/19 310/54 |
| 5,731,647 | A * | 3/1998 | Schuller | H02K 1/2746 310/114 |
| 5,912,515 | A * | 6/1999 | Ackermann | H02K 29/03 310/67 R |
| 5,917,263 | A * | 6/1999 | Sakuma | H02K 29/03 310/168 |
| 6,396,188 | B1 * | 5/2002 | Kliman | H02K 3/20 310/261.1 |
| 9,214,838 | B2 * | 12/2015 | Li | H02K 1/276 |
| 2011/0254402 | A1 * | 10/2011 | Suzuki | H02K 1/146 310/216.094 |

* cited by examiner

*Primary Examiner* — Thanh Lam

(57) ABSTRACT

An inner rotor lamination for a permanent magnet direct current motor includes a yoke and a plurality of teeth connected to the yoke. Each of the teeth has a tooth body connected to the yoke and a tooth tip connected to a distal end of the tooth body. A winding slot is formed between each two adjacent tooth bodies. One tooth tip defines one or more first through holes adjacent to a radial end thereof, and one or more second through holes. Each of the one or more second through holes is located adjacent to one circumferential end of the at least one tooth tip.

11 Claims, 9 Drawing Sheets

ROTOR LAMINATION AND MOTOR HAVING THE SAME

CROSS REFERENCE TO RELATED APPLICATIONS

This application claims priority to Chinese Patent Application No. 201711213150.0, filed Nov. 28, 2017, which is hereby incorporated by reference herein as if set forth in its entirety.

BACKGROUND

1. Technical Field

The present disclosure generally relates to motors, and particularly to a rotor lamination for a permanent magnet direct current (PMDC) motor and a PMDC motor.

2. Description of Related Art

Electromagnetic noise is one of the main sources of motor noise. It is generated because electromagnetic force acting in the air gap between the stator and the rotor generates a rotating force wave or a pulse dynamic wave, which acts on the stator to generate vibration. The electromagnetic noise is related to the harmonic magnetic field in the air gap of the motor and the amplitude and frequency of the electromagnetic force and number of poles, as well as the vibration characteristics of the stator itself. For permanent magnet DC motors, the main magnetic field generated by the stator is stationary. There is an air gap between the stator and rotor, and the main energy in the air gap is stored in a stationary area, i.e. the area under the stator poles. Considering that the air gap magnetic field is a combination of the stator and the rotor magnetic field, a radial force wave that changes with time is generated.

The reduction of the radial electromagnetic force of some conventional miniature permanent magnet DC motors is achieved by the provision of inclined slots or inclined poles, narrowing the opening width of the rotor slots, the utilization of closed slots or magnetic wedges, reducing the air gap flux density, increasing the air gap, or adopting uneven air gap. One problem with these methods is that they tend to lead to a reduction in motor torque capability and increase the difficulty of the manufacturing process of motors.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
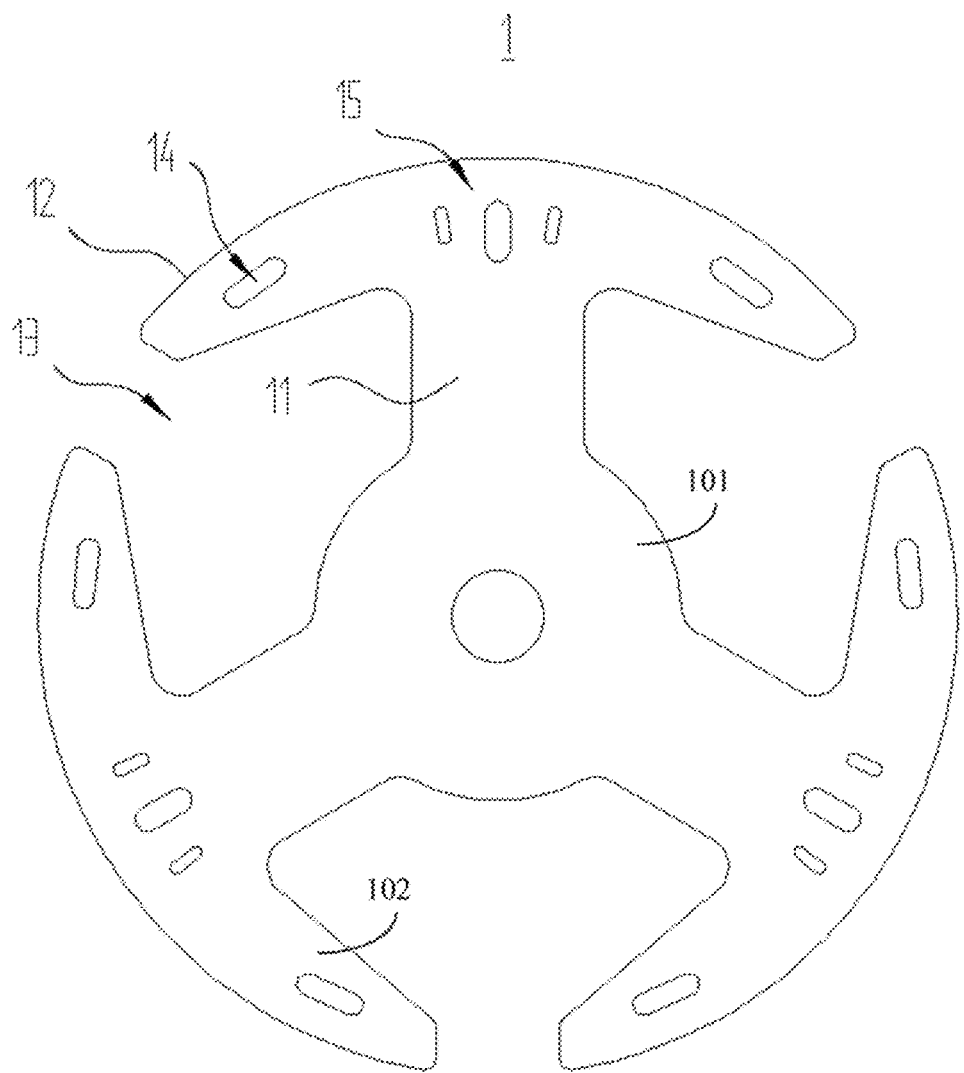
FIG. 1 is a planar view of a lamination according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
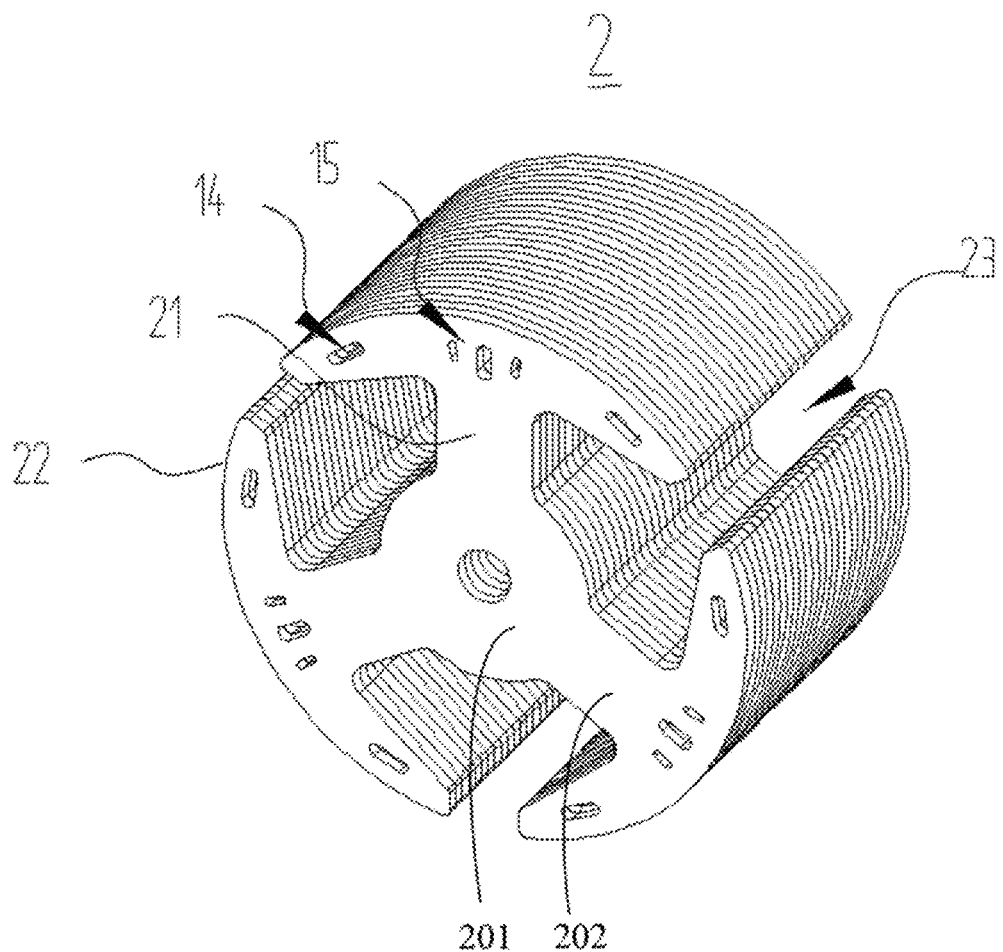
FIG. 2 is an isometric view of a rotor core according to one embodiment.

FIGS. 1 and 2 show an inner rotor lamination 1 for a PMDC motor according to one embodiment. A rotor core 2 is formed by stacking a number of the laminations 1 together. The lamination 1 includes a circular yoke 101 and a number of teeth 102 connected to the yoke. Each of the teeth 102 includes a tooth body 11 connected to the yoke and a tooth tip 12 connected to a distal end of the tooth body 11. A winding slot 13 is formed between each two adjacent tooth bodies 11. At least one tooth tip 12 defines one or more first through holes 15 adjacent to a radial end thereof, and one or more second through holes 14. Each of the one or more second through holes 14 is located adjacent to a circumferential end of the tooth tip 12. In the embodiment, the number of the first through holes 15 is three and the number of the second through holes 14 is two. It should be noted that the number of these holes is not limited and can vary according to need.

For permanent magnet DC motors, the main magnetic field generated by the stator is stationary. An air gap is formed between the stator and rotor, and the main energy in the air gap is stored in a stationary area, i.e. the area under the stator poles. Considering that the air gap magnetic field is a combination of the stator and the rotor magnetic field, a radial force wave that changes with time is generated. Analysis of the magnetic field generated by the rotor is critical.

Assuming that the distribution of the magnetic field of a DC motor is rectangular along the effective are, according to Maxwell's law, the radial force wave generated by the air gap magnetic field is represented as:

$$p_n = \frac{b^2(\theta, t)}{2\mu_0} =$$

$$\frac{1}{2\mu_0}\left\{\sum_v B_v \overline{\Lambda}_0 \cos v\theta + \sum_v \sum_k \frac{B_v \overline{\Lambda}_0}{2}\cos[(kZ_2 \pm v)\theta - kZ_2\omega_r t]\right\}^2,$$

where $$b(\theta, t) = \frac{1}{2\mu_0}\sum_{v1}\sum_{v2}\sum_k \frac{B_{v1}B_{v2}\overline{\Lambda}_0\overline{\Lambda}_k}{2}\cos\{[kZ_2 \pm (v_2 \pm v_1)\theta - kZ_2\omega_r t]\}$$

represents the air gap magnetic field, $\mu_0$ represents the relative permeability if the air, $B_v$ represents the amplitude of the vth harmonics of the air gap flux density, $\overline{\Lambda}_k$(k=0, 1, 2, . . . ) represents the specific-permeability, $Z_2$ represents the number of rotor slots, $\omega_r$ represents angular velocity of the rotor, $B_{v1}$ represents the amplitude of the vth harmonics of the air gap flux density of the stator, and $B_{v2}$ represents the amplitude of the vth harmonics of the air gap flux density of the rotor.

The main magnetic field of the stator interacts with the first-order tooth harmonic magnetic field of the rotor, and the generated force wave is the main source that causes the electromagnetic noise and vibration of a DC motor.

Let v1=v2=1, k=1, the alternating radial force acting on the magnetic pole with a length of 1p by integration is:

$$p_n = \frac{\varepsilon}{4\mu_0} B_\delta^2 \cos\{[Z_2 \pm (1 \pm 1)]\theta - Z_2\omega_r t\},$$

where $$\varepsilon = \frac{\overline{\Lambda}_1}{\overline{\Lambda}_0}, B_\delta = B_1\overline{\Lambda}_0.$$

Therefore, when other parameters are constant, reducing the magnetic permeability of the rotor core can reduce the force per unit area of the magnetic pole, i.e. the radial force wave generated by the air gap magnetic field. Therefore, the electromagnetic noise of the motor can be suppressed.

In the embodiment, the lamination 1 can have a reduced magnetic permeability by arranging three through holes 15 adjacent to the radial end of the tooth tip 12 and the through holes 14 adjacent to the circumferential ends of the tooth tip 12, thereby reducing the radial force wave generated by the air gap magnetic field.

Being able to ensure the torque capability of the motor and avoid using complicated manufacturing processes, the PMDC motor of the embodiment changes the path of the magnetic lines of force of the rotor lamination by reducing the magnetic permeability of the rotor lamination, which reduces the amplitude of the radial force wave of the air gap of the PMDC motor, thereby reducing the electromagnetic noise of the PMDC motor.

However, if the magnetic permeability of the rotor core is too small, the magnetic resistance will be unnecessarily large, which causes that the magnetic potential drop on the rotor core is increased, the iron loss of the rotor becomes larger, the magnetic leakage of the motor increases, resulting in poor torque performance and high temperature rise and low efficiency. Therefore, the change of the magnetic permeability of the lamination 1 needs to be controlled in a reasonable range.

In the embodiment, the through holes 14 and 15 are defined in each of the tooth tip 12 so as to decrease the magnetic permeability. It should be noted that it needs to avoid the partial saturation of the rotor magnetic field which negatively affects the output torque of the motor.

In an alternative embodiment, the number of the through holes 14 is greater than or equal to 2 and the number of the through holes 15 is greater than or equal to 2.

In the embodiment, at least one of the one or more first through holes 15 extends in a first direction, and at least one of the one or more second through holes 14 extends in a second direction that is different from the first direction. At least one of the one or more first through holes 15 extends in a radial direction of the lamination 1. The two second through holes 14 of each tooth tip 12 are symmetric with respect to the tooth body 11 to which the tooth tip is connected.

At least one of the one or more first through holes 15 and at least one of the one or more second through holes 14 are rectangular holes with round corners, and the rectangular holes have substantially the same length. In the embodiment, the through holes 15 includes a large hole and two small holes that are symmetric with respect to the big hole. The three holes 15 each extend along an imaginary radial line that passes through the center of the lamination 1. Each through hole 14 extends in direction substantially perpendicular to an imaginary line that passes through the center of the lamination 1. The two through holes 14 and the large hole have the same length. With such arrangement the lamination 1 can have the desired magnetic permeability while avoiding the partial saturation of the magnetic field thereof.

In one embodiment, a PMDC motor includes the core 2 formed by stacking a number of laminations 1 together. The core 2 includes a yoke 201 and a number of teeth 202 connected to the yoke. Each of the teeth 202 includes a tooth body 21 and a tooth tip 22. A winding slot 23 is formed between each two tooth bodies 21.

Because of the through holes 14 and 15, the core 2 can have a reduced magnetic permeability, which reducing the radial force wave generated by the air gap magnetic field. In addition, most of the magnetic lines of force are distributed along the extending direction of the tooth bodies 21, and only a few magnetic lines of force pass through the tooth tips 22. Thus, the arrangement of through holes 15 in the tooth tips 22 will not result in the partial saturation of the magnetic field, will not affect the magnetic induction strength of the core, and will not reduce the magnetic flux passing through the tooth bodies 21. As a result, the torque capability of the motor can be effectively maintained.

In other words, since the core 2 is formed by stacking a number of laminations 1 together, the arrangement of the through holes 14 and 15 allows the core 2 to have a reduced magnetic permeability and can change the path of the magnetic liens of force, which reduces the radial force wave generated by the air gap magnetic field and reduces electromagnetic noise of PMDC motor.

Figure 3:
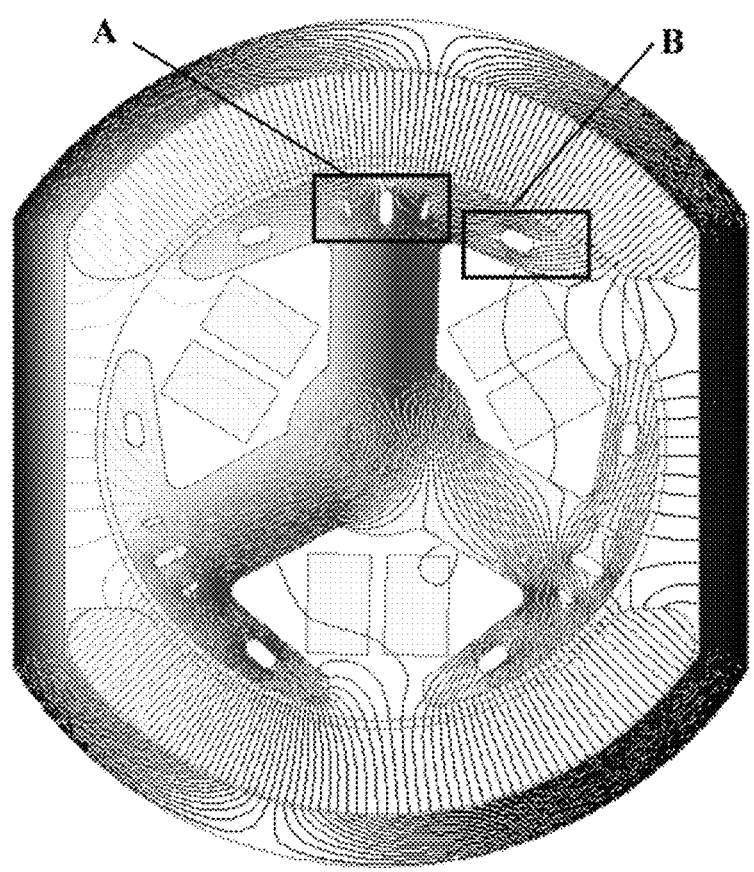
FIG. 3 is a diagram showing the simulated distribution of magnetic lines of force of a motor according to one embodiment, which works at the rated power.

Simulation shows that expected effect is achieved by arranging the through holes 14 and 15 as described above. As shown in FIG. 3 which is a diagram showing the simulated distribution of the magnetic flux density of the rotor core when the motor is working at the rated power, the magnetic flux density of the rotor core with the through holes 14 and 15 is less than 1.8 T, and partial saturation of the magnetic field does not occur.

In the embodiment, simulations are made for the motor working at the rated power with a rotational speed of 15000 r/min and at the maximum power with a rotational speed of 10000 r/min. In both situations, the amplitude of the radial force wave of the simulated motor is reduced to different extents. As the current increases, the proportion of the cross-axis air gap magnetic field generated by the magnetomotive force in the combined air gap magnetic field is increased, causing the distortion of the air gap magnetic field to become larger. With the through holes 15 defined in the rotor, the partial saturation of the tooth tips 22 is increased, the magnetic permeability is decreased, the distortion caused by the air gap magnetic field is reduced, and the radial force wave is reduced. Due to the combined effects of the permeability of the rotor core and the air gap magnetic field, the amplitude of the radial force wave of the air gap is significantly reduced to a greater extent when the motor is working at its maximum power.

The table below shows the comparison of the simulated performance parameters of a conventional PMDC motor and the PMDC motor of the embodiment, both of which work at the rated power.

|  | Conventional PMDC Motor | PMDC Motor of the Present Embodiment |
|---|---|---|
| Rotational Speed (r/min) | 15000 | 15000 |
| Current (A) | 0.40 | 0.40 |
| Electromagnetic Torque (mNm) | 1.278 | 1.284 |
| Torque Ripple (%) | 20.851 | 20.578 |
| Reduction of Torque Ripple (%) | — | 1.37 |
| Amplitude of Air Gap Radial Force Wave (N/m$^2$) | 107232.5 | 103509.7 |
| Reduction of Amplitude of Air Gap Radial Force Wave (%) | — | 3.60 |

As can be seen in the table above, when working at the rated power, the conventional PMDC motor and the PMDC motor of the embodiment have substantially the same electromagnetic torque. Because of the through holes 14 and 15, the torque ripple of the motor of the embodiment is reduced by 1.37%, and the amplitude of the air gap radial force wave is reduced by 3.60%.

The table below shows the comparison of the simulated performance parameters of a conventional PMDC motor and the PMDC motor of the embodiment both of which work at the maximum power.

|  | Conventional PMDC Motor | PMDC Motor of the Present Embodiment |
|---|---|---|
| Rotational Speed (r/min) | 10000 | 10000 |
| Current (A) | 0.72 | 0.72 |
| Electromagnetic Torque (mNm) | 2.258 | 2.260 |
| Torque Ripple (%) | 14.866 | 14.530 |
| Reduction of Torque Ripple (%) | — | 2.31 |
| Amplitude of Air Gap Radial Force Wave (N/m$^2$) | 131526.1 | 121945.0 |
| Reduction of Amplitude of Air Gap Radial Force Wave (%) | — | 7.86 |

As can be seen in the table above, when working at the maximum power, the conventional PMDC motor and the PMDC motor of the embodiment have substantially the same electromagnetic torque. Because of the through holes 14 and 15, the torque ripple of the motor of the embodiment is reduced by 2.31%, and the amplitude of the air gap radial force wave is reduced by 7.86%.

According to the two tables above, when working at the rated power and the maximum power, the amplitude of the air gap radial force wave of the PMDC motor of the embodiment is reduced. Thus, the electromagnetic noise of the motor is effectively suppressed.

Figure 4:
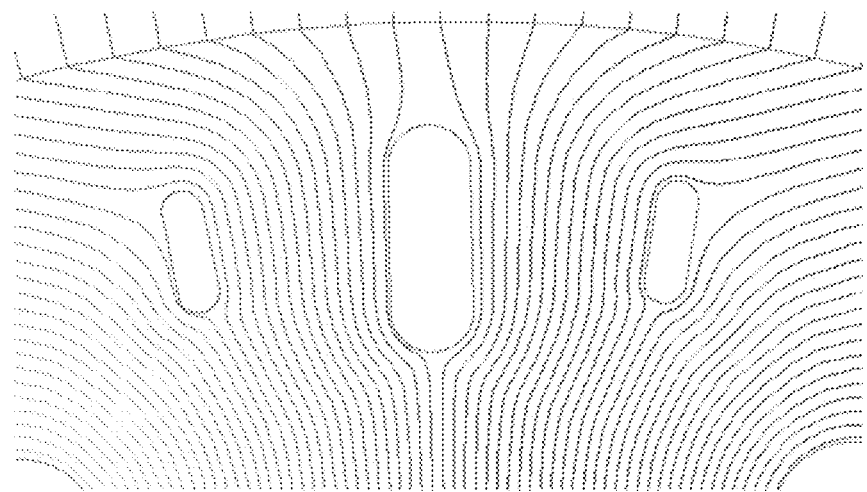
FIG. 4 is an enlarged view of the portion A of FIG 3.
Figure 5:
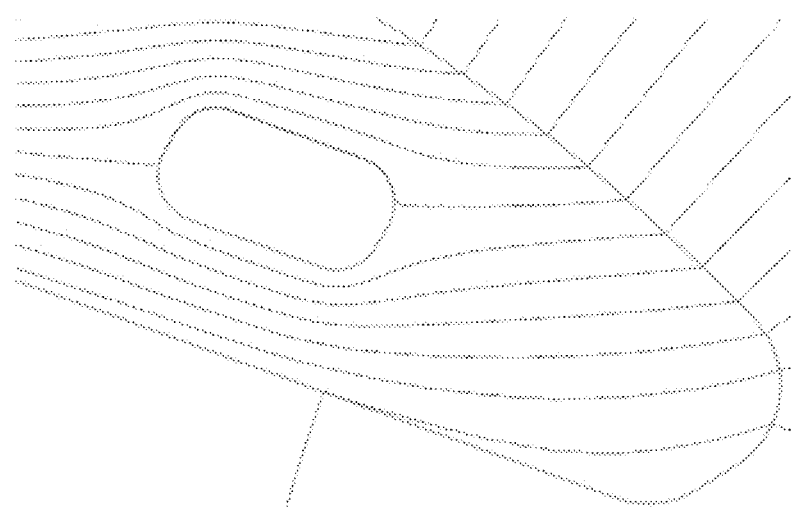
FIG. 5 is an enlarged view of the portion B of FIG 3.

FIG. 4 is an enlarged view of an area A in FIG. 3. FIG. 5 is an enlarged view of an area B in FIG. 3. As can be clearly seen in FIGS. 4 and 5, the path of the magnetic lines of force changes due to the arrangement of the through holes 14 and 15.

Figure 6:
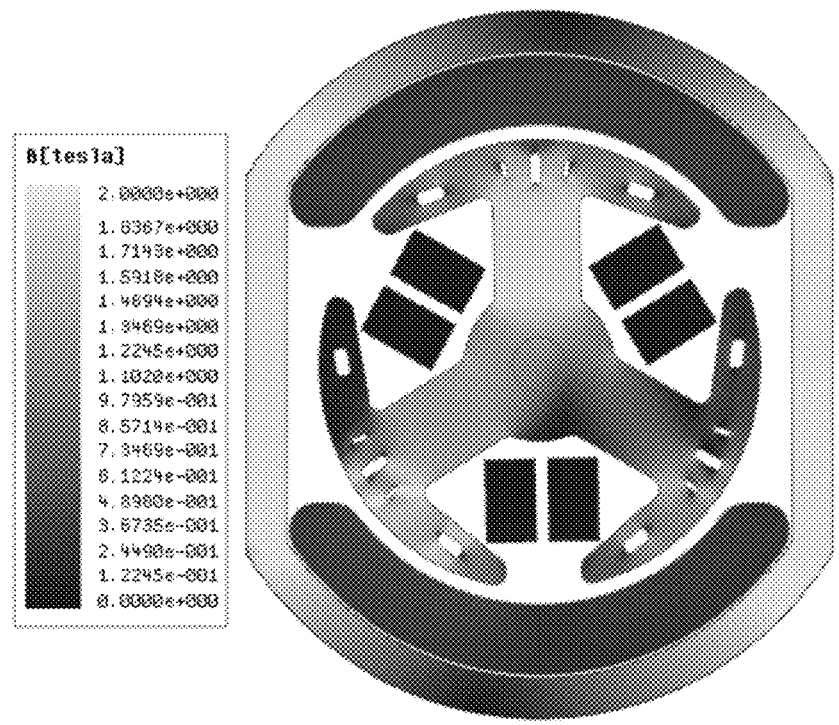
FIG. 6 is a diagram showing the simulated magnetic induction, intensity of a motor according to one embodiment, which works at the rated power.

FIG. 6 is a diagram showing the simulated magnetic induction intensity of PMDC motor working at the rated power. The partial saturation of the magnetic field of the rotor core does not occur due to the arrangement of the through holes 14 and 15.

Figure 7:
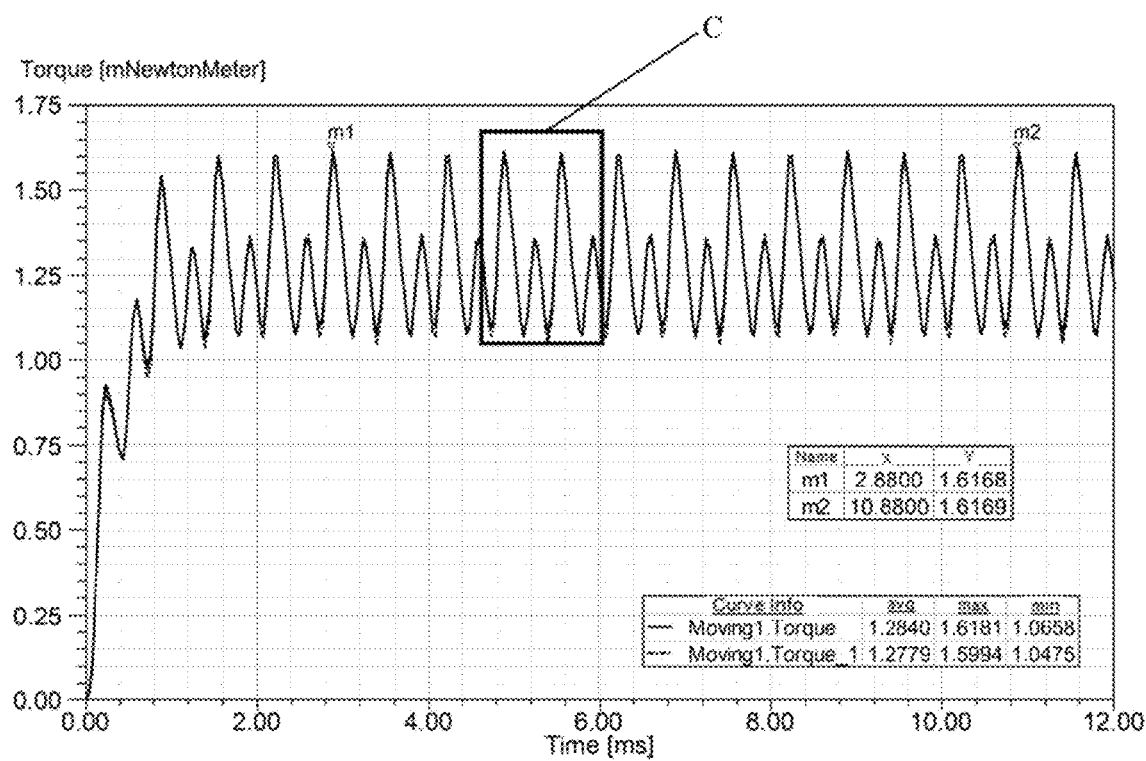
FIG. 7 shows the comparison between the electromagnetic torque curve of the motor according to one embodiment and the electromagnetic torque curve of a conventional motor, both of which work at the rated power.
Figure 8:
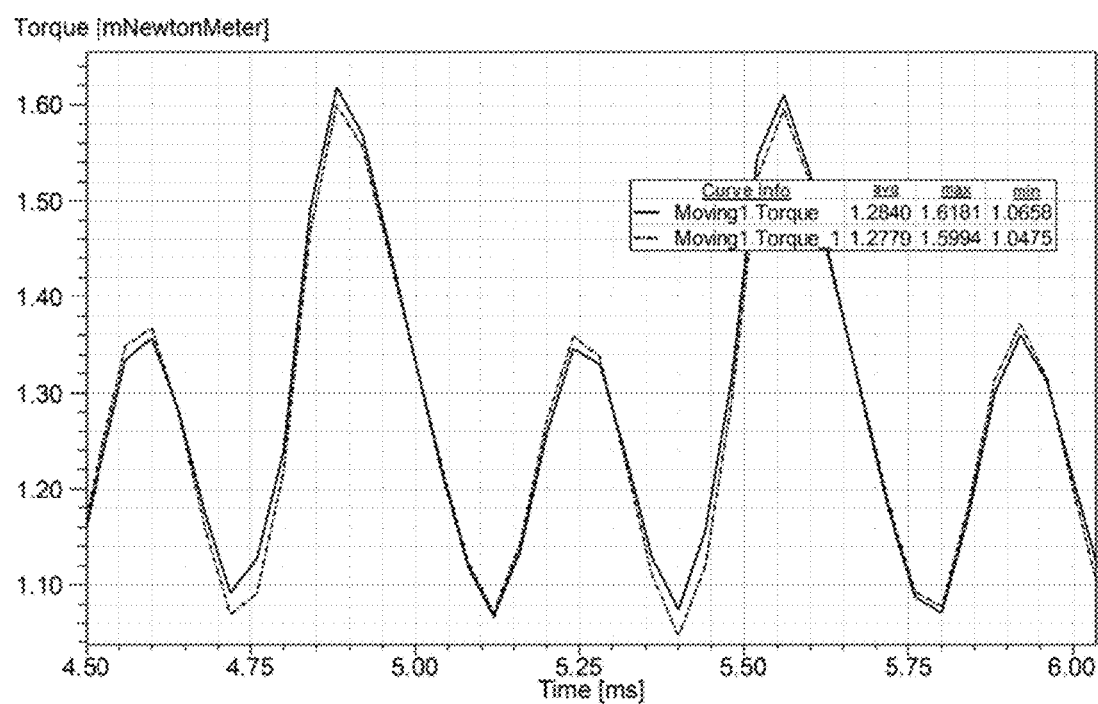
FIG. 8 is an enlarged view of the portion C of FIG 7.

FIG. 7 shows the comparison between the electromagnetic torque curve (solid line) of the motor of the present embodiment and the electromagnetic torque curve of (dashed line) a conventional motor, both of which work at the rated power. The two curves in FIG. 7 almost completely overlap each other, and the difference between them can be seen from an enlarged view of the area C in FIG. 8 which shows that the electromagnetic torque ripple of the PMDC motor of the embodiment is smaller. Thus, the arrangement of the through holes 14 and 15 does not affect the electromagnetic torque of the PMDC motor of the embodiment.

Figure 9:
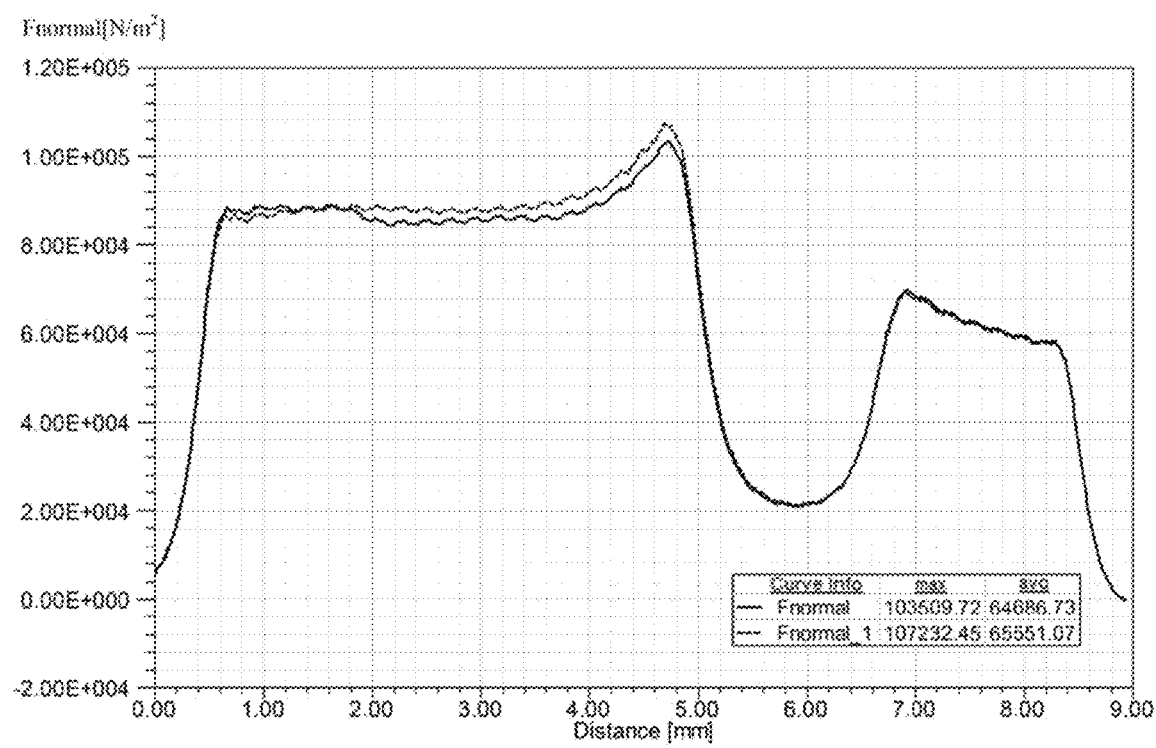
FIG. 9 shows the comparison of the distribution carves of the radial force waves in the air gap of the motor according to one embodiment and a conventional motor, both of which work at the rated power.

FIG. 9 shows the comparison of the distribution curves of the radial force waves in the air gap of the motor of the embodiment and a conventional motor, both of which work at the rated power. The solid line curve is the distribution curve of the radial force wave in the air gap of the motor of the embodiment, and the dashed line curve is the distribution curve of the radial force wave in the air gap of the conventional motor. As clearly shown in FIG. 9, the amplitude and average value of the radial force wave in the air gap of the motor of the embodiment are reduced.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An inner rotor lamination for a permanent magnet direct current motor, comprising: a yoke and a plurality of teeth connected to the yoke, each of the teeth comprising a tooth body connected to the yoke and a tooth tip connected to a distal end of the tooth body, a winding slot being formed between each two adjacent tooth bodies, at least one tooth tip defining one or more first through holes adjacent to a radial end thereof, and one or more second through holes, each of the one or more second through holes being located adjacent to one circumferential end of the at least one tooth tip.

2. The inner rotor lamination according to claim 1, wherein at least one of the one or more first through holes extends in a first direction, and at least one of the one or more second through holes extends in a second direction that is different from the first direction.

3. The inner rotor lamination according to claim 2, wherein at least one of the one or more first through holes extends in a radial direction of the inner rotor lamination.

4. The inner rotor lamination according to claim 1, wherein a number of the one or more second through holes is two, and the two second through holes of each tooth tip are symmetric with respect to the tooth body to which the tooth tip is connected.

5. The inner rotor lamination according to claim 1, wherein at least one of the one or more first through holes and at least one of the one or more second through holes are rectangular holes with round corners, and the rectangular holes have substantially the same length.

6. A rotor core for a permanent magnet direct current motor comprising a plurality of rotor core laminations that are stacked together, each of the rotor core laminations comprising: a yoke and a plurality of teeth connected to the yoke, each of the teeth comprising a tooth body connected to the yoke and a tooth tip connected to a distal end of the tooth body, a winding slot being formed between each two adjacent tooth bodies, at least one tooth tip defining one or more first through holes adjacent to a radial end thereof, and one or more second through holes so as to allow the rotor core to have a reduced magnetic permeability, each of the one or more second through holes being located adjacent to one circumferential end of the tooth tip.

7. The rotor core according to claim 6, wherein at least one of the one or more first through holes extends in a first direction, and at least one of the one or more second through holes extends in a second direction that is different from the first direction.

8. The rotor core according to claim 6, wherein a number of the one or more second through holes is two, and the two second through holes of each tooth tip are symmetric with respect to the tooth body to which the tooth tip is connected.

9. A permanent magnet direct current (PMDC) motor comprising a rotor core comprising a plurality of laminations that are stacked together, each of the laminations comprising: a yoke and a plurality of teeth connected to the yoke, each of the teeth comprising a tooth body connected to the yoke and a tooth tip connected to a distal end of the tooth body, a winding slot being formed between each two adjacent tooth bodies, at least one tooth tip defining one or more first through holes adjacent to a radial end thereof, and one or more second through holes so as to allow the rotor core to have a reduced magnetic permeability, each of the one or more second through holes being located adjacent to one circumferential end of the tooth tip.

10. The PMDC motor according to claim 9, wherein at least one of the one or more first through holes extends in a first direction, and at least one of the one or more second through holes extends in a second direction that is different from the first direction.

11. The PMDC motor according to claim 9, wherein a number of the one or more second through holes is two, and the two second through holes of each tooth tip are symmetric with respect to the tooth body to which the tooth tip is connected.

\* \* \* \* \*